(12) United States Patent  
Royannez et al.

(10) Patent No.: US 8,812,885 B2
(45) Date of Patent: Aug. 19, 2014

(54) DETECTING WAKE-UP EVENTS FOR A CHIP BASED ON AN I/O POWER SUPPLY

(75) Inventors: Philippe Royannez, Villeneuve Loubet (FR); Gilles Dubost, Valbonne (FR); Christophe Vatinel, Mouans Sartoux (FR); William Douglas Wilson, Dallas, TX (US); Vinod Menezes, Cooke Town (IN); Hugh Mair, Fairview, TX (US); James Sangwon Song, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 852 days.

(21) Appl. No.: 11/695,304

(22) Filed: Apr. 2, 2007

(65) Prior Publication Data

US 2008/0162969 A1 Jul. 3, 2008

Related U.S. Application Data

(60) Provisional application No. 60/882,407, filed on Dec. 28, 2006.

(51) Int. Cl.
*G06F 1/00* (2006.01)
*G06F 1/26* (2006.01)
*G06F 1/32* (2006.01)

(52) U.S. Cl.
USPC .............. 713/323; 713/300; 713/320

(58) Field of Classification Search
CPC ............ G06F 1/3203; H03K 19/0016

USPC .................................................. 713/300, 320
See application file for complete search history.

(56) References Cited

U.S. PATENT DOCUMENTS

| | | | |
|---|---|---|---|
| 5,666,071 A * | 9/1997 | Hawkins et al. | 326/86 |
| 6,772,356 B1 * | 8/2004 | Qureshi et al. | 713/321 |
| 7,026,840 B1 * | 4/2006 | May et al. | 326/38 |
| 7,251,738 B2 * | 7/2007 | Stedman et al. | 713/324 |
| 7,664,970 B2 * | 2/2010 | Jahagirdar et al. | 713/300 |
| 2002/0083349 A1 | 6/2002 | Khatri et al. | |
| 2002/0163355 A1 * | 11/2002 | van Bavel et al. | 326/30 |
| 2004/0097265 A1 * | 5/2004 | Cadieux et al. | 455/557 |
| 2005/0035895 A1 | 2/2005 | Byrne et al. | |
| 2005/0091629 A1 | 4/2005 | Eisenstadt et al. | |
| 2006/0186917 A1 * | 8/2006 | May et al. | 326/39 |
| 2007/0157042 A1 * | 7/2007 | Jahagirdar et al. | 713/320 |
| 2007/0157051 A1 * | 7/2007 | Hernandez et al. | 714/1 |
| 2008/0086650 A1 * | 4/2008 | Ozawa | 713/310 |

* cited by examiner

*Primary Examiner* — Kim Huynh
*Assistant Examiner* — Brandon Kinsey
(74) *Attorney, Agent, or Firm* — Ronald O. Neerings; Frederick J. Telecy, Jr.

(57) ABSTRACT

A device is provided that includes a chip having a processor and wake-up logic. The device also includes power management circuitry coupled to the chip. The power management circuitry selectively provides a core power supply and an input/output (I/O) power supply to the chip. Even if the power management circuitry cuts off the core power supply to the chip, the wake-up logic detects and responds to wake-up events based on power provided by the I/O power supply.

16 Claims, 5 Drawing Sheets

DETECTING WAKE-UP EVENTS FOR A CHIP BASED ON AN I/O POWER SUPPLY

CROSS-REFERENCE TO RELATED APPLICATIONS

This application claims the benefit of Provisional Application Ser. No. 60/882,407 filed Dec. 28, 2006, titled "Detecting Wake-Up Events For A Chip Based On An I/O Power Supply", which is incorporated by reference herein as if reproduced in full below.

FIELD OF THE INVENTION

The present disclosure is directed to mobile devices or other battery operated devices, and more particularly, but not by way of limitation, to devices which selectively shut off power to internal circuitry to minimize power consumption.

BACKGROUND

Mobile devices and other battery operated devices are dependent on a limited power supply. In order to increase the operational duration of such devices without recharging or replacing batteries, efforts are made to minimize unnecessary power consumption. For example, if an integrated circuit of a device is not continuously needed, the integrated circuit can be selectively powered on and off. Many integrated circuits are selectively powered on and off locally (e.g., by switches within the integrated circuit). This method suffers from undesirable leakage current (power consumption) due among other things to imperfect switches.

SUMMARY

In at least some embodiments, a device comprises a chip having a processor and wake-up logic. The device further comprises power management circuitry coupled to the chip. The power management circuitry selectively provides a core power supply and an input/output (I/O) power supply to the chip. Even if the power management circuitry cuts off the core power supply to the chip, the wake-up logic detects and responds to wake-up events based on power provided by the I/O power supply.

In at least some embodiments, a chip comprises a core with a processor. The chip further comprises wake-up logic coupled to core. The core operates based on a core power supply. If the core power supply is cut off externally to the chip, the wake-up logic operates based on an I/O power supply.

In at least some embodiments, a method comprises cutting off a core power supply to a chip. The method further comprises monitoring wake-up events for the chip using circuitry powered based on an input/output (I/O) power supply.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the disclosure involve semiconductor chips having core logic and wake-up logic. To conserve power, a core power supply to the core logic is selectively cut off from a location external to the chip. Unlike the core logic, the wake-up logic is powered by an input/output (I/O) power supply that always remains on. In at least some embodiments, the I/O power supply is modified prior to powering the wake-up logic. The wake-up logic detects and responds to wake-up events even if the core power supply has been cut off.

Figure 1:
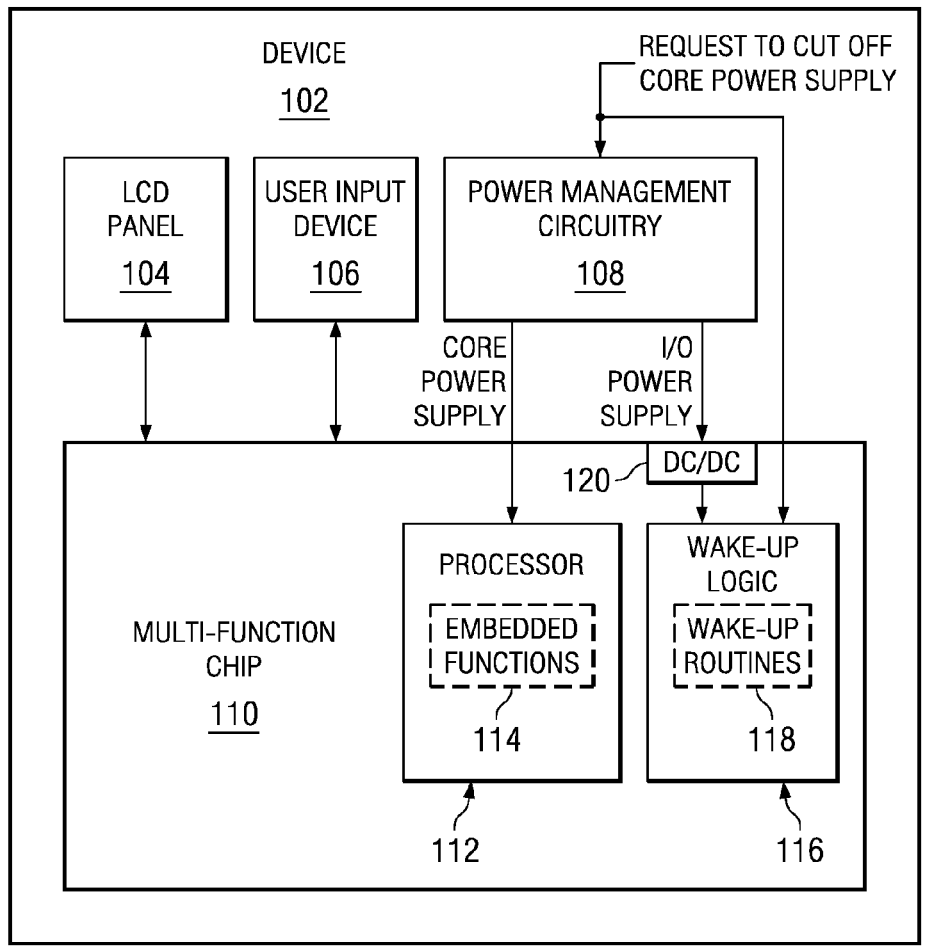
FIG. 1 shows a device in accordance with embodiments of the disclosure.

FIG. 1 shows a device 102 in accordance with embodiments of the disclosure. The device 102 may be a cell phone, a smart phone, a personal digital assistant (PDA), an MP3 player, or another battery operated device now known or later developed. As shown in FIG. 1, the device 102 comprises an LCD panel 104 coupled to a multi-function chip 110. The multi-function chip 110 comprises a processor 112 having various embedded functions 114 and wake-up logic 116 having at least one wake-up routine 118. In at least some embodiments, the multi-function chip 110 represents a "system on a chip" (SoC) and may comprise other components now known or later developed.

As shown in FIG. 1, the device 102 further comprises power management circuitry 108 coupled to the multi-function chip 110. The power management circuitry 108 selectively provides a core power supply and an input/output (I/O) power supply to the multi-function chip 110. In at least some embodiments, the I/O power supply has a higher voltage level than the core power supply. As an example, the core power supply may be 0.9 Volts and the I/O power supply may be 1.8 Volts. As shown, the multi-function chip 110 also comprises a DC/DC converter 120 such as a low dropout converter (LDO) that reduces the voltage level of the I/O power supply for use by the wake-up logic 116.

The device 102 also comprises a user input device 106 coupled to the multi-function chip 110. The user input device 106 enables a user to interface with the device 102 and may correspond to a keyboard, a keypad, a touchpad, buttons, switches or other input devices now known or later developed.

In at least some embodiments, the power management circuitry 108 receives a request to cut off the core power supply. For example, this request may be in response to user input provided via the user input device 106. Alternatively, the request may be based on inactivity of the device 102 or of the multi-function chip 110. Alternatively, an embedded function 114 or other routine may cause the processor 112 to issue the request to the power management circuitry 108. In response to the request, the power management circuitry 108 selectively cuts off the core power supply to the multi-function chip 110, but continues to provide the I/O power supply.

The wake-up logic 116 also receives notification of the request to cut off the core power supply. In response to receiving the request, the wake-up logic 116 stores the current pad state (low or high) of some or all pads of the multi-function chip 110. The timing or order in which the power management circuitry 108 and the wake-up logic 116 receive and process the request can vary as long as the wake-up logic 116 is able to store the current pad states before the core power supply is cut off. As an example, if the wake-up logic 116 receives the request to cut off the core power supply, the wake-up logic 116 responds by storing the current pad states. Once storage of the current pad states is complete, the request to cut off the core power supply could be forwarded or confirmed to the power management circuitry 108 which then cuts off the core power supply.

While the core power supply is cut off, the wake-up logic 116 continues to function based on the reduced I/O power supply and monitors the occurrence of wake-up events. For example, the wake-up logic 116 may comprise circuitry that detects and stores changes to the stored pad states. Such changes could be caused, for example, by external signals being received by the multi-function chip 110. In at least some embodiments, the external signals are activated by a user interacting with the user input device 106 (e.g., by touching a keyboard, a keypad, a touchpad, a button, a switch or other input devices). If the wake-up logic 116 detects changes to a stored pad state, the wake-up logic 116 responds by polling its circuitry to determine which pad was affected. The wake-up logic 116 then correlates the affected pad with one of various wake-up events and responds accordingly. For example, the wake-up logic 116 may respond to a particular wake-up event by executing one or more wake-up routines 118.

The wake-up routines 118 enable various tasks to be performed such as refreshing an image on the LCD panel 104, restoring the core power supply to parts of the multi-function chip 110 or restoring the core power supply to all of the multi-function chip 110. In at least some embodiments, one or more of the wake-up routines 118 cause the multi-function chip 110 to perform a temporary task, after which the multi-function chip 110 returns to an "off" state. The temporary task may or may not require restoring the core power supply to the multi-function chip 110.

Figure 2:
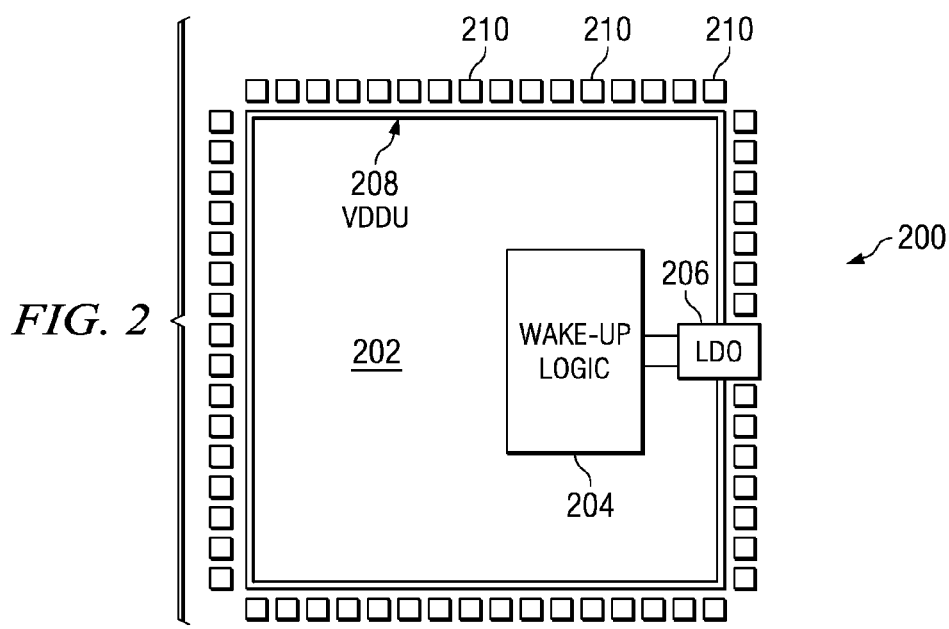
FIG. 2 illustrates an integrated circuit in accordance with embodiments of the disclosure.

FIG. 2 illustrates an integrated circuit 200 (e.g., the multi-function chip 110 of FIG. 1) in accordance with embodiments of the disclosure. As shown in FIG. 2, the integrated circuit 200 comprises a core 202 powered by a core power supply. The core 202 represents, for example, the processor 112, the embedded functions 114, communication logic, or other core logic. The integrated circuit 200 further comprises an I/O ring 208 which runs around the perimeter of the core 202. The I/O ring 208 receives power from an LDO 206 which supplies a reduced I/O power supply ("VDDU") for use by circuitry located along the I/O ring 208. Embodiments of the circuitry are described in FIGS. 3-5. As will later be described, the circuitry is able to monitor wake-up events by detecting external signals received by the pads 210 of the integrated circuit 200. The LDO 206 also provides VDDU to the wake-up logic 204. The wake-up logic 204 together with the circuitry of FIGS. 3-5 can perform, for example, the functions described for the wake-up logic 116 discussed in FIG. 1. In at least some embodiments, VDDU is provided from the LDO 206 to the I/O ring 208 and the wake-up logic 204 even if the core power supply (VDD) to the integrated circuit 200 has been cut off.

Figure 3:
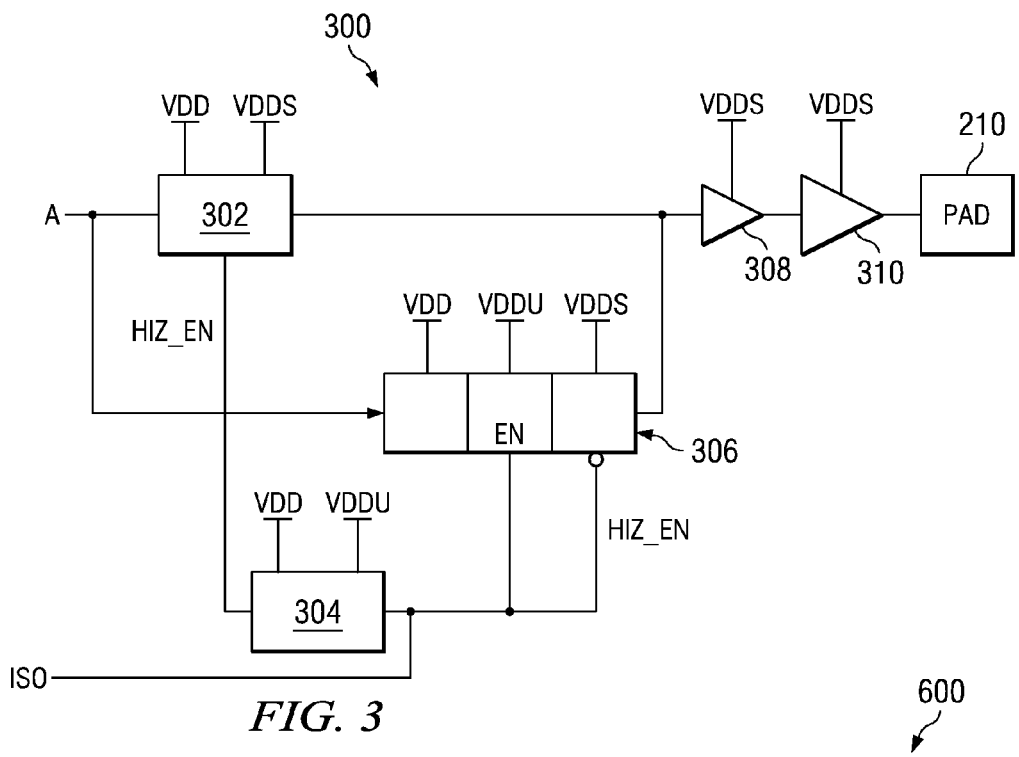
FIG. 3 illustrates circuitry to selectively store a pad state in accordance with embodiments of the disclosure.

FIG. 3 illustrates circuitry 300 to selectively store a pad state in accordance with embodiments of the disclosure. The circuitry 300 can be implemented for some or all pads 210 of the integrated circuit 200. As shown in FIG. 3, the circuitry 300 comprises logic 302 (e.g., a level shifter) that receives the signal A from the core 202. If VDD and the VDDS are high and the logic 302 is enabled, the signal A is propagated to a pad 210 via buffers 308 and 310. In at least some embodiments, the logic 302 is enabled/disabled based on an isolation control signal ("ISO") which is propagated by logic 304 when VDD and VDDU are high. In the embodiment of circuitry 300, the logic 302 is only disabled when ISO is propagated by the logic 304 and is high. As an example, ISO may be high when VDD is cut off or is going to be cut off and may be low otherwise.

The circuitry 300 also comprises logic 306 (e.g., a latch) which selectively captures and propagates the signal A. As an example, if ISO is low, the logic 306 may capture but does not propagate the signal A (i.e., ISO is used to enable/disable propagation of the signal captured by the logic 306). If ISO is high and VDD is off, the logic 306 maintains and propagates the last captured state of the signal A (i.e., while VDD is off, new states for the signal A are not captured). In this manner, a valid state for the signal A can be provided to the given pad 210 of the integrated circuit 200. The stored state of the signal A can be propagated to other components of a device (e.g., the device 102) or can be compared with external signals being received at the given pad 210 to detect wake-up events.

While the circuitry 300 shows one embodiment that selectively stores a pad state, other embodiments are possible. In general, embodiments such as the circuitry 300 propagate a signal ("A") from the core 202 to a given pad 210 if the core power supply ("VDD") is on. If VDD is cut off or is going to be cut off, the circuitry 300 stores and propagates the last state of the signal A (before VDD is cut off) to the given pad 210.

Figure 4:
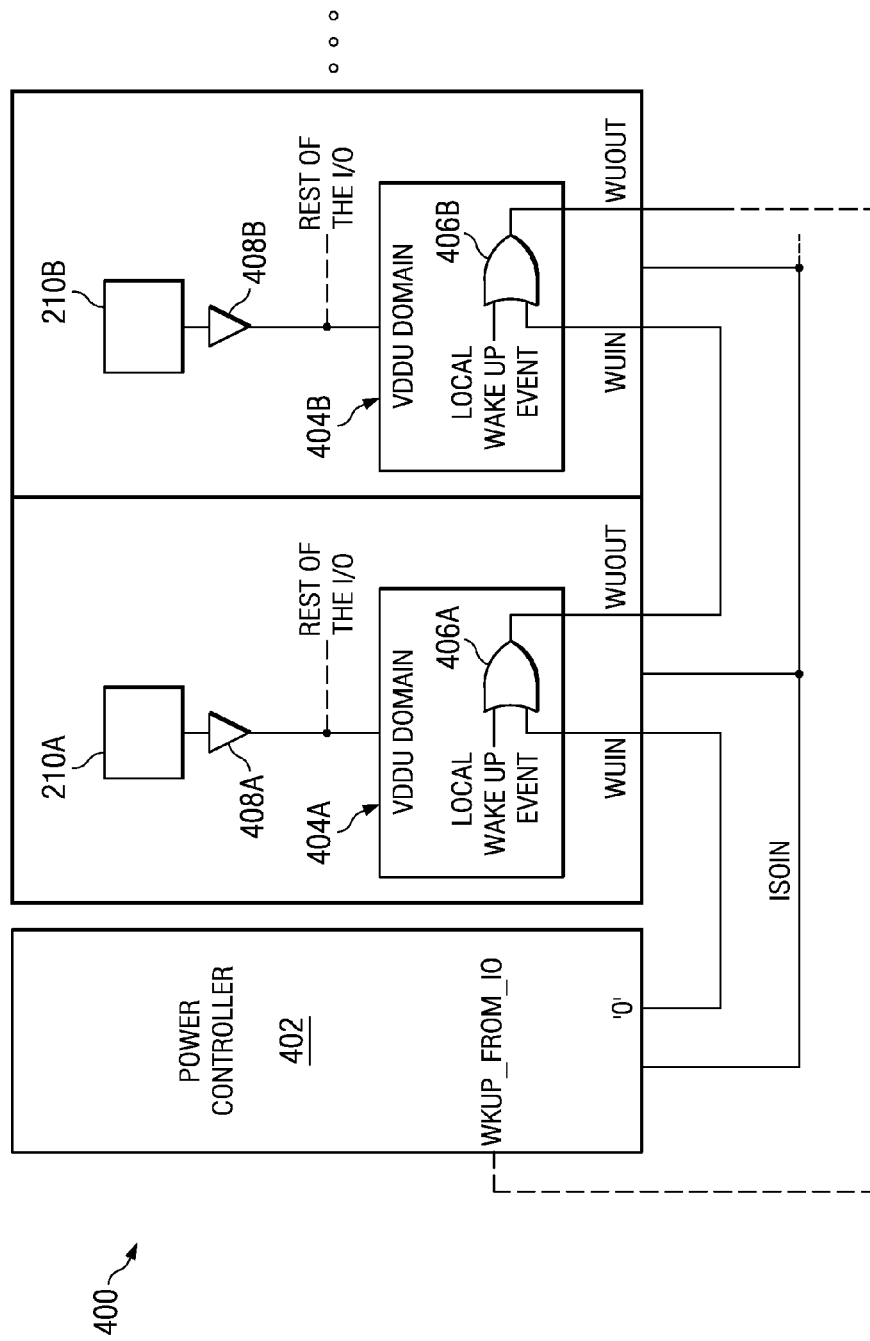
FIG. 4 illustrates circuitry to propagate a wake-up event signal in accordance with embodiments of the disclosure.

FIG. 4 illustrates circuitry 400 to propagate a wake-up event signal in accordance with embodiments of the disclosure. The circuitry 400 can be implemented for some or all pads 210 of the integrated circuit 200. In at least some embodiments, the circuitry 400 comprises logic powered by the VDDU domain 404A, 404B. For example, a daisy chain of OR gates 406A, 406B can be used to propagate a local wake-up event from any pad of interest to a power controller (PC) 402 associated with the wake-up logic 204.

In at least some embodiments, the VDDU domain 404A, 404B corresponds to the I/O ring 208 discussed in FIG. 2. In other words, the circuitry 400 can be positioned around the perimeter of the core 202 and can be powered by the I/O ring 208. For example, the VDDU domain 404A and the OR gate 406A can be positioned near the pad 210A and a filter 408A which handles spikes in power. Similarly, the VDDU domain 404B and the OR gate 406B can be positioned near the pad 210B and a filter 408B. While the circuitry 400 shows one embodiment that propagates local wake-up event signals to the wake-up logic 204, other embodiments are possible.

Figure 5:
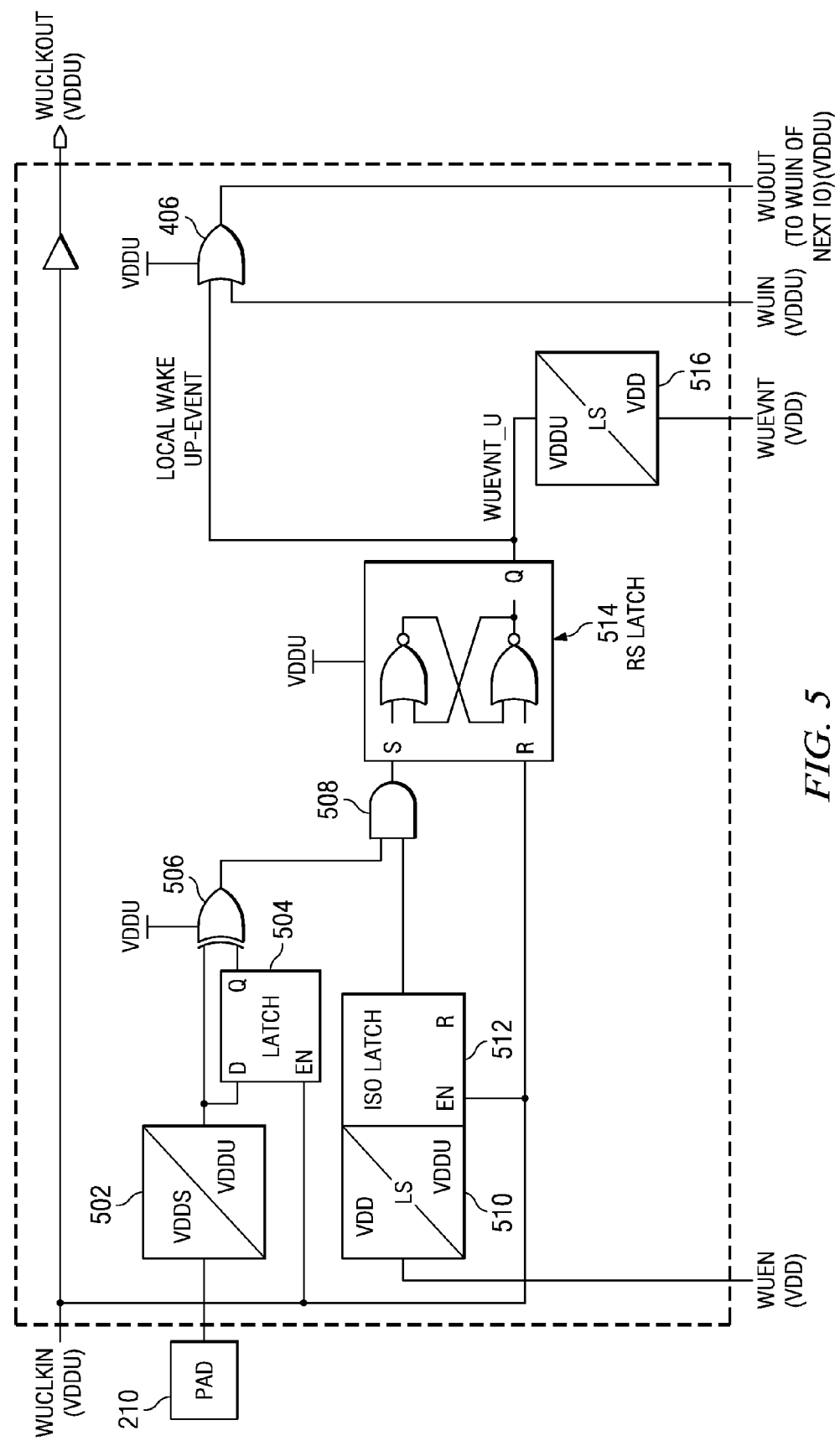
FIG. 5 illustrates circuitry to detect changes to a pad state in accordance with embodiments of the disclosure.

FIG. 5 illustrates circuitry 500 to detect changes to a pad state in accordance with embodiments of the disclosure. The circuitry 500 can be implemented for some or all pads 210 of the integrated circuit 200. In at least some embodiments, the circuitry 500 is separate from the circuitry 300. As shown in FIG. 5, the circuitry 500 may include a daisy chained OR gate 406 such as the OR gates 406A and 406B discussed for FIG. 4.

In FIG. 5, the logic 502 propagates a pad state. The pad state is received by an XOR gate 506 and a latch 504 which is selectively enabled by a control signal ("WUCLKIN"). Changes to the pad state cause the XOR gate 506 to output a "1". The output of the XOR gate 506 is input to an AND gate 508 which also receives a control signal ("WUEN") as input. WUEN selectively permits the output of the XOR gate 506 to be propagated to the RS latch 514. As shown, WUEN is provided to the AND gate 508 via logic 510 and 512 based on an enable signal ("WUCLKIN"). In at least some embodiments, WUEN is high if VDD has been cut off or is going to be cut off. In other words, changes to a pad state are monitored while VDD is cut off.

If the AND gate 508 outputs a "1" (indicating a pad state change), the RS latch 514 captures this output and asserts a local wake-up event signal ("WUEVNT_U") to the daisy chained OR gate 406 (e.g., 406A or 406B) and to logic 516. The OR gate 406 outputs a wake-up signal ("WUOUT") to the next component of the daisy chained logic (e.g., 406A to 406B) and so on until the wake-up logic 204 receives notification that a pad state change has occurred. In response, the wake-up logic 204 polls the circuitry 500 (e.g., the output "WUEVNT" of the logic 516) of each pad of interest to determine which pad experienced the state change. The wake-up logic 204 is able to interpret pad state changes and react accordingly.

As shown in FIG. 5, the daisy chained OR gate 406 may also receive an external wake-up signal ("WUIN") as input. WUIN is received from a previous component of the daisy chained logic of which the OR gate 406 is a part. If WUIN is high, the OR gate 406 propagates a high signal to the next component of the daisy chained logic (i.e., WUOUT may be asserted due to the local wake-up event signal WUEVNT_U or the external wake-up signal WUIN). In either case, an asserted WUOUT signal is propagated through the daisy chained logic to the wake-up logic 204. In FIG. 5, all logic is powered by VDDU with logic 510 and 516 also capable of being powered by VDD.

While the circuitry 500 shows one embodiment that detects changes to a pad state, other embodiments are possible. In general, embodiments such as the circuitry 500 are powered by VDDU (the reduced I/O power supply) and can detect and store pad state changes that occur after VDD (the core power supply) is cut off. The circuitry 500 stores information regarding which pad experienced the state change and enables the wake-up logic 204 to correlate a pad state change with a wake-up event and respond accordingly.

For example, the wake-up logic 204 may respond to a particular wake-up event by executing one or more wake-up routines (e.g., the wake-up routines 118 of FIG. 1). The wake-up routines enable various tasks to be performed such as refreshing an image on an LCD panel, restoring the core power supply to parts of the integrated circuit 200 or restoring the core power supply to all of the integrated circuit 200. In at least some embodiments, one more of the wake-up routines cause the integrated circuit 200 to perform a temporary task, after which the integrated circuit 200 returns to an "off" state. The temporary task may or may not require restoring the core power supply to the integrated circuit 200.

Figure 6:
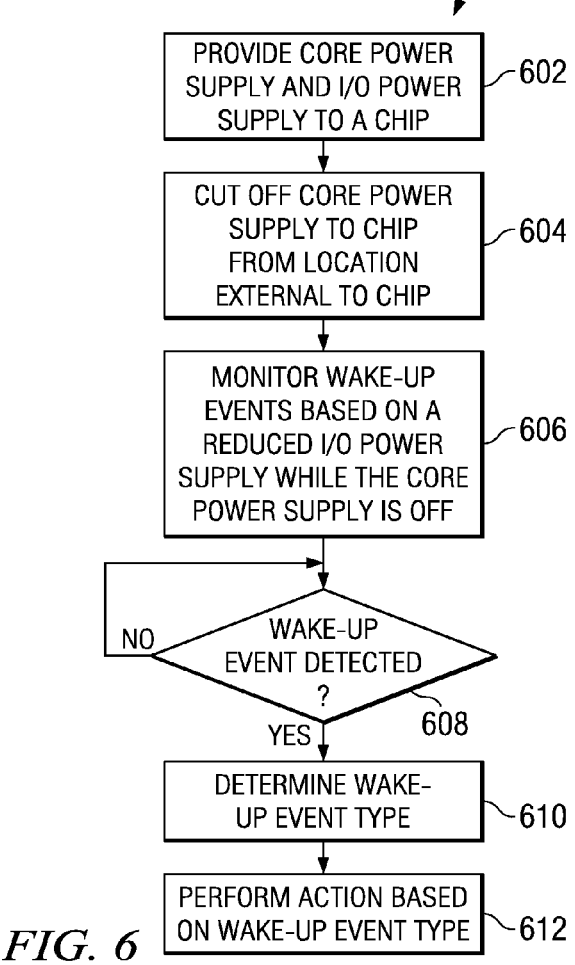
FIG. 6 illustrates a method in accordance with embodiments of the disclosure.

FIG. 6 illustrates a method 600 in accordance with embodiments of the disclosure. As shown in FIG. 6, the method 600 comprises providing a core power supply and an I/O power supply to a chip (block 602). At block 604, the core power supply is cut off from a location external to the chip (e.g., from the power management circuitry 108). At block 606, wake-up events are monitored based on a reduced I/O power supply while the core power supply is off. If a wake-up event is not detected (determination block 608), the method 600 returns to block 606. If a wake-up event is detected (determination block 608), a determination is made as to the wake-up event type (block 610). An action is then performed based on the wake-up event type (block 612).

Figure 7:
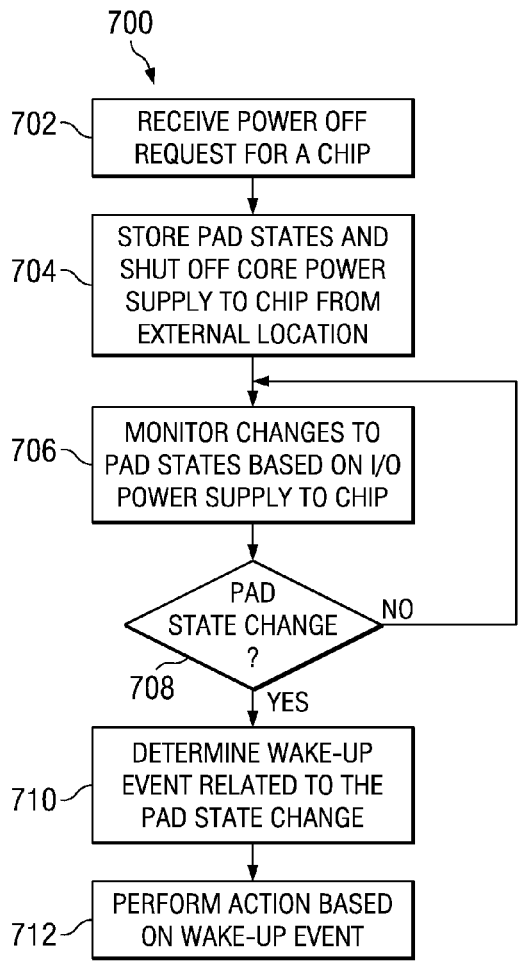
FIG. 7 illustrates another method in accordance with embodiments of the disclosure.

FIG. 7 illustrates another method 700 in accordance with embodiments of the disclosure. As shown in FIG. 7, the method 700 comprises receiving a power off request for a chip (block 702). In response, pad states are stored and the core power supply to the chip is shut off (block 704). Changes to the pad states are then monitored based on an I/O power supply provided to the chip (block 706). If a pad state does not change (determination block 708), the method 700 returns to block 706. If a pad state changes (determination block 708), a wake-up event related to the pad state change is determined (block 710). An action is then performed based on the wake-up event (block 712).

Figure 8:
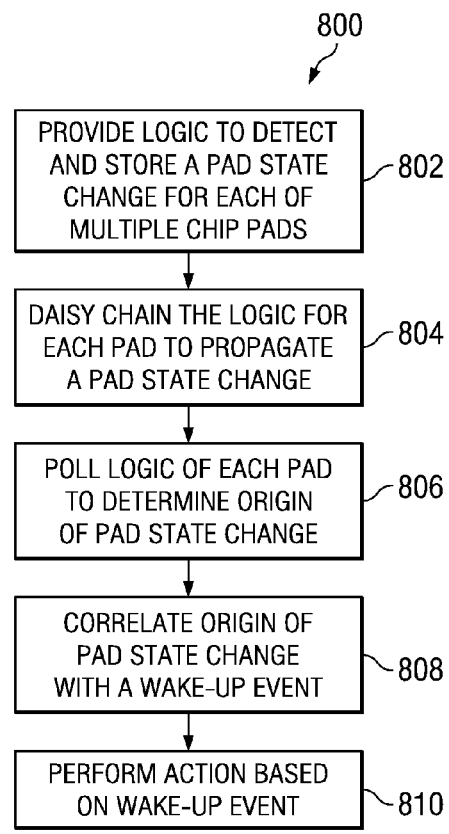
FIG. 8 illustrates another method in accordance with embodiments of the disclosure.

FIG. 8 illustrates another method 800 in accordance with embodiments of the disclosure. As shown in FIG. 8, the method 800 comprises providing logic to detect and store a pad state change for each of multiple chip pads (block 802). At block 804, the method 800 daisy chains the logic for each pad to propagate a pad state change. At block 806, logic of each pad is polled to determine the origin of the pad state change. The origin of the pad state change is then correlated with a wake-up event (block 808). Finally, an action is performed based on the wake-up event (block 810).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A device, comprising:
a chip having a processor and wake-up logic;
power management circuitry coupled to the chip, the power management circuitry selectively provides a core power supply and an input/output (I/O) power supply to the chip;
wherein, even if the power management circuitry cuts off the core power supply to the chip, the wake-up logic detects and responds to wake-up events based on power provided by the I/O power supply; and
wherein, while the core power supply is cut off, the wake-up logic propagates a pad state change using daisy chained logic and circuitry of the wake-up logic is polled to determine an origin of a pad state change propagated using the daisy chained logic.

2. The device of claim 1 wherein the chip comprises a voltage converter that provides a reduced I/O power supply voltage for use by the wake-up logic.

3. The device of claim 2 wherein the chip comprises an input/output (I/O) ring that supplies the reduced I/O power supply voltage to circuitry of the wake-up logic positioned around the chip.

4. The device of claim 1 wherein the wake-up logic captures and stores a plurality of pad states before the core power supply is cut off.

5. The device of claim 4 wherein, while the core power supply is cut off, the wake-up logic compares stored pad states with new pad states to detect pad state changes.

6. The device of claim 1 wherein, while the core power supply is cut off, the wake-up logic correlates detected pad state changes with different wake-up events.

7. The device of claim 1 wherein, while the core power supply is cut off, the wake-up logic selectively executes wake-up routines.

8. The device of claim 7 wherein at least one of the wake-up routines is performed without providing the core power supply to the chip.

9. The device of claim 7 wherein at least one of the wake-up routine causes the core power supply to be provided to some, but not all core components of the chip.

10. A chip, comprising:
a core with a processor; and
wake-up logic coupled to core, wherein the core operates based on a core power supply;
wherein, even if the core power supply is cut off externally to the chip, the wake-up logic propagates a pad state change using daisy chained logic and circuitry of the wake-up logic is polled to determine an origin of a pad state change propagated using the daisy chained logic.

11. The chip of claim 10 further comprising a voltage converter that reduces the I/O power supply voltage for use by the wake-up logic.

12. The chip of claim 10 further comprising a plurality of pads and circuitry associated with each pad, wherein, if the core power supply is on, the circuitry propagates a signal state from the core and wherein, if the core power supply is cut off, the circuitry propagates a signal state captured prior to the core power supply being cut off.

13. The chip of claim 10 further comprising a plurality of pads and circuitry associated with each pad, wherein the circuitry detects and stores pad state changes for use by the wake-up logic.

14. A method, the method comprising:
cutting off a core power supply to a chip;
monitoring wake-up events for the chip using circuitry powered based on an input/output (I/O) power supply comprising propagating a pad state change using daisy chained logic and polling components of the circuitry after receiving the propagated pad state change.

15. The method of claim 14 further comprising selectively propagating, for at least one pad of the chip, a current core signal state and a stored core signal state.

16. The method of claim 14 wherein said monitoring wake-up events comprises detecting and storing, for at least one pad of the chip, a pad state change.

* * * * *